United States Patent [19]

Cronk et al.

[11] 3,912,070

[45] Oct. 14, 1975

[54] TRAY HANDLING APPARATUS

[75] Inventors: Vern V. Cronk, Hemlock; John A. Illikman, Saginaw; Roger J. Gendron, Bridgeport, all of Mich.

[73] Assignee: Baker Perkins, Inc., Saginaw, Mich.

[22] Filed: Apr. 8, 1974

[21] Appl. No.: 458,988

[52] U.S. Cl. .............. 198/35; 198/162; 214/6 FA; 214/8.5 R
[51] Int. Cl.² ......................................... B65G 59/00
[58] Field of Search ............ 198/20 R, 35, 131, 162, 198/163, 177 R, 179; 214/1 BA, 6 A, 6 B, 8.5 R, 8.5 A, 8.5 SS, 6 F, 6 FA

[56] References Cited
UNITED STATES PATENTS

| | | | |
|---|---|---|---|
| 1,601,971 | 10/1926 | Knapp | 214/8.5 C |
| 2,108,457 | 2/1938 | Tobia | 198/35 |
| 2,684,800 | 7/1954 | Lewis | 198/179 |
| 2,919,821 | 1/1960 | Young | 198/35 |
| 3,129,826 | 4/1964 | Rohrbach | 198/163 |
| 3,429,466 | 2/1969 | Puderbach | 214/8.5 C |

*Primary Examiner*—Evon C. Blunk
*Assistant Examiner*—Joseph E. Valenza
*Attorney, Agent, or Firm*—Learman & McCulloch

[57] ABSTRACT

Tray handling apparatus for stacking or unstacking trays or baskets, as for example the wire mesh baskets employed in commercial baking operations. A pair of endless chain conveyors are located in spaced opposed alignment with each other with the two chains moving along like generally rectangular paths lying in parallel vertical general planes. Each chain carries a series of spaced pivotally supported hook assemblies and both chains are synchronously driven so that the hook assemblies move along the respective chain paths in horizontally aligned opposed pairs. The hook assemblies are mounted upon the chains for pivotal movement between an inwardly inclined tray engaging position in which opposed hook assemblies cooperatively support and convey a tray between the two chains and an inactive position where the hook assemblies can pass freely by a tray located between the two chains. An infeed conveyor is employed to feed trays to a ready position between one opposed pair of vertical runs of the two chains to be picked up by the hook assemblies, conveyed upwardly and across the horizontal upper runs of the two chains and then lowered down the opposite vertical run to be deposited at a receiving station. The hook assemblies are gravitationally biased to one of their engaging or inactive positions and shifted to the other of their two positions by cams or other mechanisms located along appropriate places on the chain paths. Two forms of hook assemblies are disclosed, one form being employed to transfer trays from single line horizontal conveyance into a vertical stack, while the other form of hook assembly is employed to disassemble a vertical stack of trays and transfer the trays to single line conveyance.

3 Claims, 16 Drawing Figures

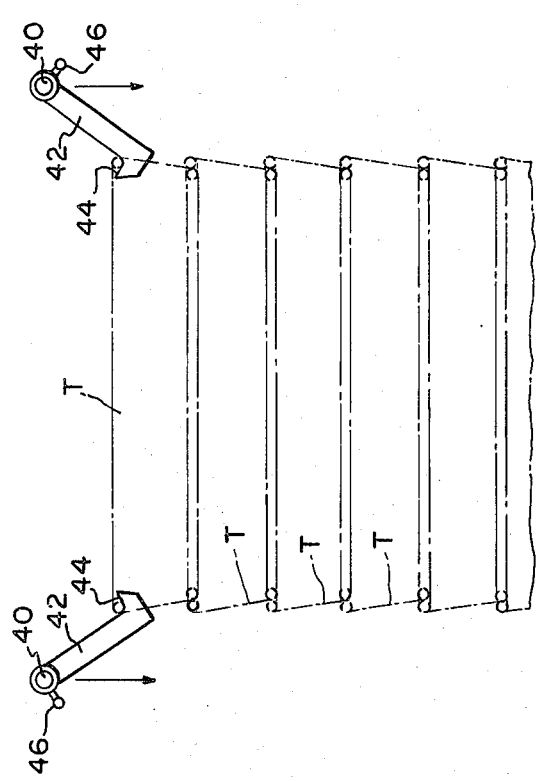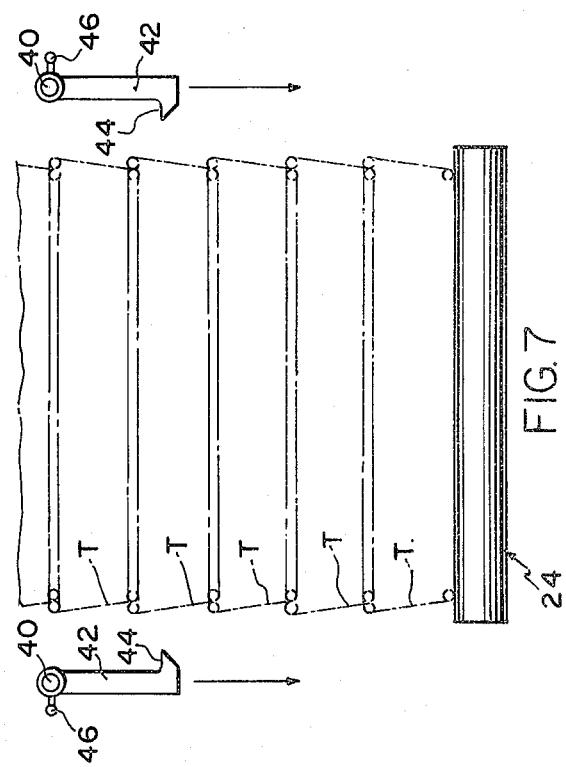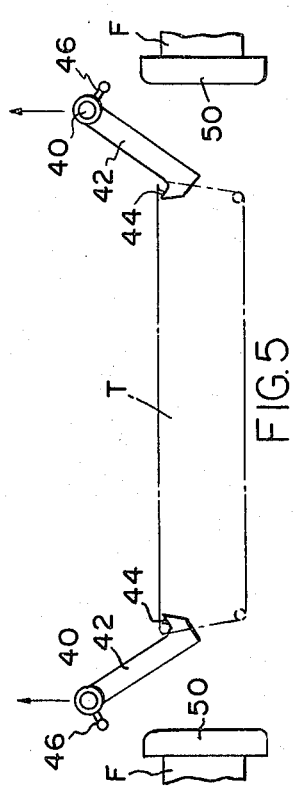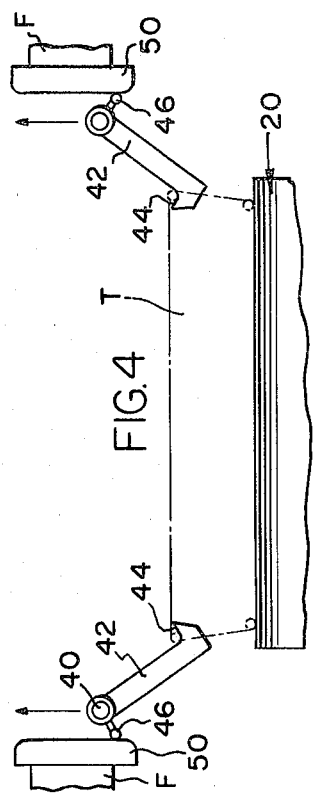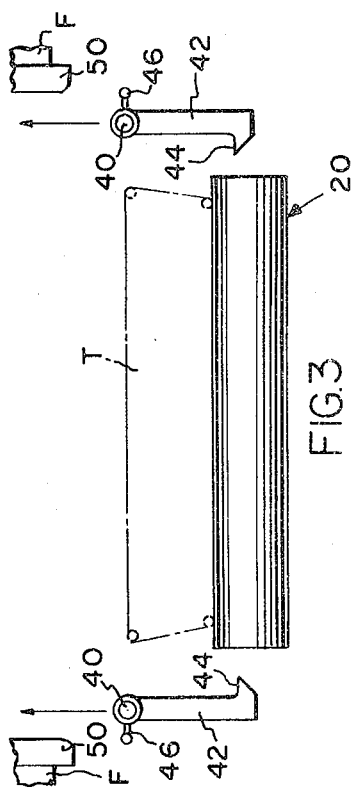

# 3,912,070

TRAY HANDLING APPARATUS

BACKGROUND OF THE INVENTION

Although useful in other environments, the tray handling apparatus of the present invention was specifically designed for use in commercial baking operations where it is frequently desired to remove mesh trays of baked goods from a single line conveyor to assemble the trays into vertical stacks for further handling. Frequently, in such operations, it is desired to reverse the process — that is to disassemble vertical stacks of trays to locate the trays in line on a conveyor. The present invention is especially directed to the provision of a basic conveyor structure which, with minor modifications, is equally available for use in a stacking or unstacking operation of the foregoing type.

SUMMARY OF THE INVENTION

The basic machine includes a pair of spaced opposed endless chain conveyors whose chains are mounted for movement along generally rectangular paths lying in spaced parallel vertical planes. The two chains are synchronously driven in one direction around their respective endless paths and are spaced from each other by a distance exceeding the width of a tray to be handled by the machine. Each chain carries a series of spaced hook assemblies mounted upon the chain for pivotal movement about horizontal axes lying within the vertical general plane of the respective chain paths. An infeed conveyor for conveying trays into operative relationship with the tray handling apparatus is employed to feed trays to a ready position in which the tray (or stack of trays) is positioned symmetrically between one opposed pair of vertical runs of the two hook carrying chains.

The pivotal mounting and hook configuration is such that the hooks may be selectively located in either of a tray engaging position or an inactive position. When the hooks are located in their inactive position, the hooks move in paths spaced outwardly from the opposite sides of trays at the ready position and do not engage trays. When the hooks are located in their tray engaging position, the hooks on the opposed chains are inclined inwardly from their respective chains to move in paths such that the hooks move upwardly into engagement with a wire rim or other hook receiving means on the tray to lift a tray from the ready position to convey the tray upwardly, across the horizontal upper run and downwardly along the opposite vertical runs to a tray receiving position.

When the apparatus is employed in a stacking operation, the infeed conveyor feeds trays in single line to the ready position, and a hook assembly is employed which has a configuration such that the hook is normally gravitationally maintained in its inactive or tray clearing position. As the hooks are driven upwardly along the vertical run at opposite sides of the ready position of the tray, follower arms on the hooks engage stationary cams located adjacent the chain path and the engagement between the cam and follower pivots the hooks inwardly to their tray engaging position so that the hooks pick a tray up from the ready position, convey the tray across the top of the apparatus and downwardly along the opposite vertical run until the tray is deposited at a receiving station. During this transfer, the weight of the tray and the manner in which the tray engages the hooks maintains the hooks engaged with the tray until the tray is lowered on the opposite vertical run to the support provided by the receiving station. When the weight of the tray is released from the hooks, further downward movement of the hooks permit the hooks to swing free of the tray to continue downwardly, then back along the lower horizontal run to again be elevated along the first vertical run to pick up a subsequent tray. A stack of trays is formed at the receiving station by transfer of successive trays from the ready position as described above, the succeeding trays each being deposited on top of the next preceding tray in the stack and the hooks automatically releasing as soon as support of the tray is transferred from the hooks to the stack at the receiving station.

When the apparatus is employed to disassemble a tray stack, a modified form of hook assembly is employed in which the hook is provided with a counterweight which gravitationally biases the hook to its tray engaging position. A stack of trays is advanced by the infeed conveyor toward the ready position, and as the stack approaches the ready position, the leading end of the stack engages a pair of vertically elongate gate panels mounted for movement about vertical axes at each side of the infeed conveyor. The advancing stack pivots the engaged panels to an open position, in which the gate panels engage crank arms of hook assemblies moving upwardly in front of the advancing stack, the engagement between the open gate and crank assemblies swinging the hooks back to their inactive position so that the stack can advance to the ready position without interference from the continuously moving hooks. When the stack has passed completely beyond the gate panels, the gate panels automatically return to their original closed position, thus disengaging the gate panels from the upwardly moving crank arms of the hook assemblies. With the stack in the ready position, the hooks advance upwardly along the side of the stack, but are maintained in their inactive position during this upward movement along the stack sides by follower arms which slide along the side of the stack and when engaged with the sides of the stack hold the hook members in their inactive positions. The follower members are located above the hook element itself and thus clear the uppermost tray in the stack before the hook arrives at horizontal alignment with the uppermost tray. The counterweight, upon disengagement of the follower arm from the stack, promptly swings the hook inwardly to its normal tray engaging position, and the top tray of the stack is picked up, carried across the upper run and lowered along the opposite vertical run to be deposited on a take-away conveyor.

Other objects and features of the invention will become apparent by reference to the following specification and to the drawings.

IN THE DRAWINGS

Figure 1:
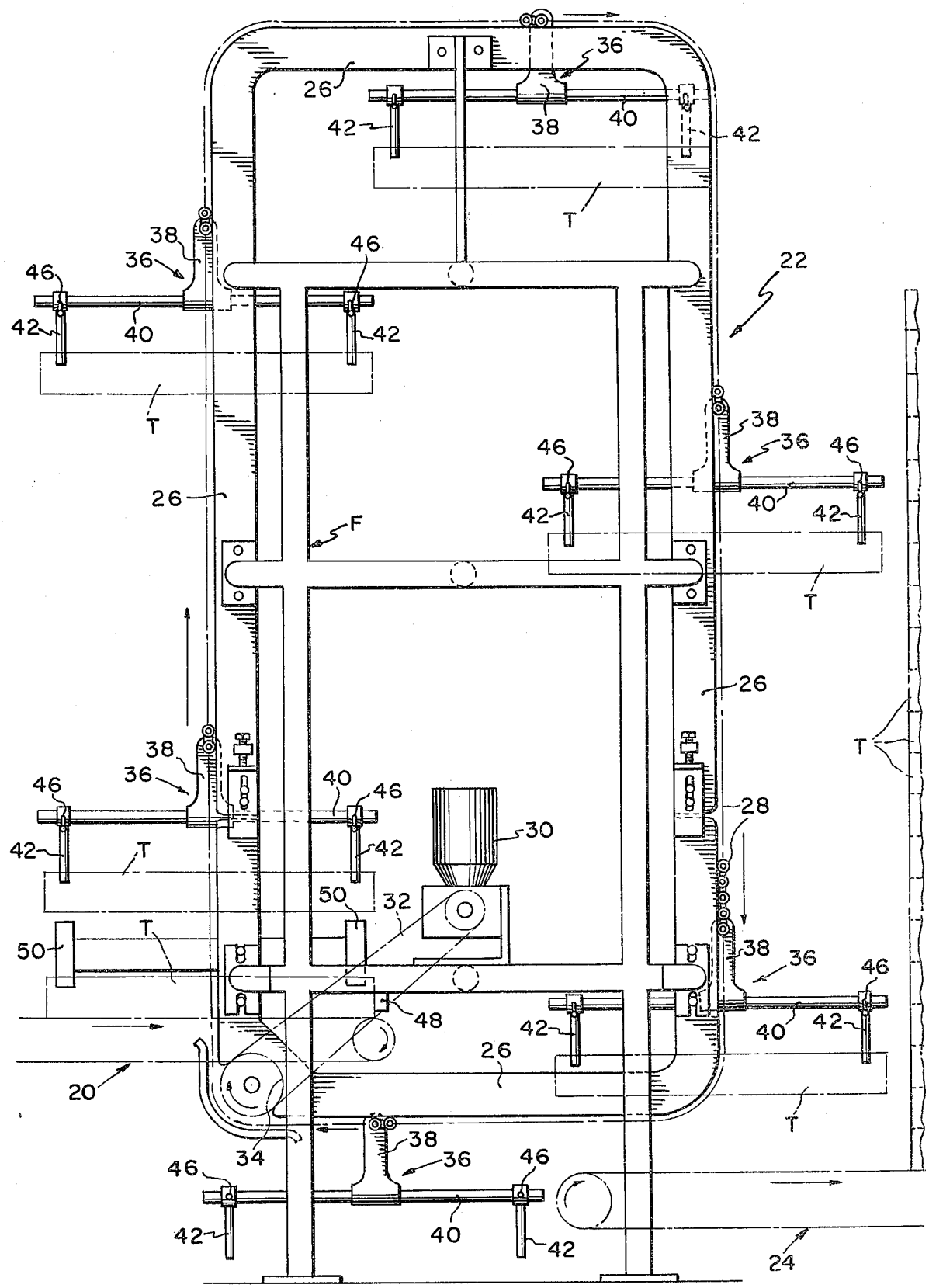
FIG. 1 is a side elevational view of apparatus embodying the present invention employed in a stacking operation.
Figure 9:
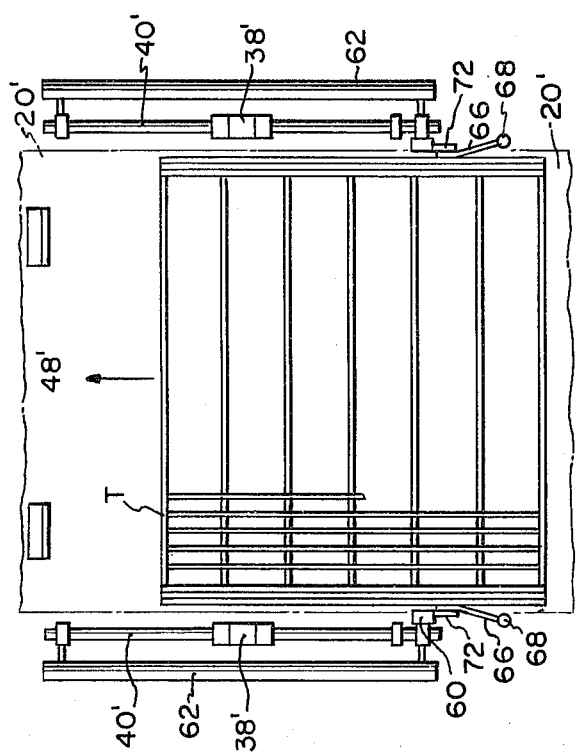
Figure 10:
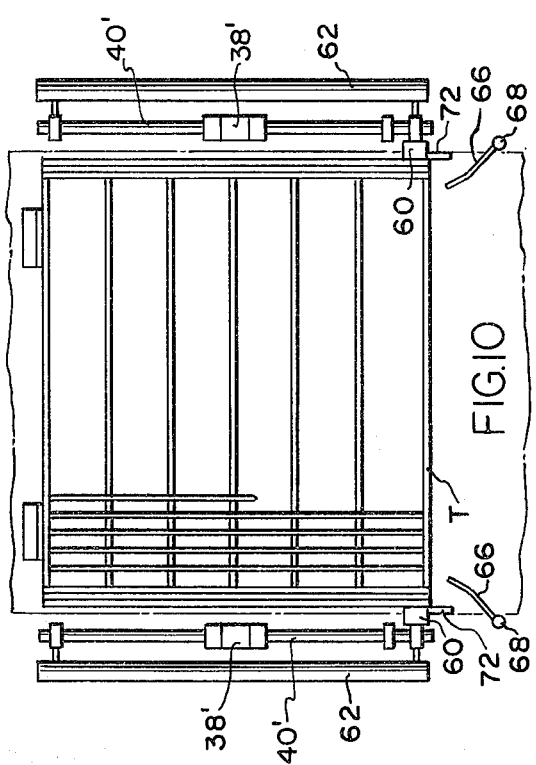
Figure 8:
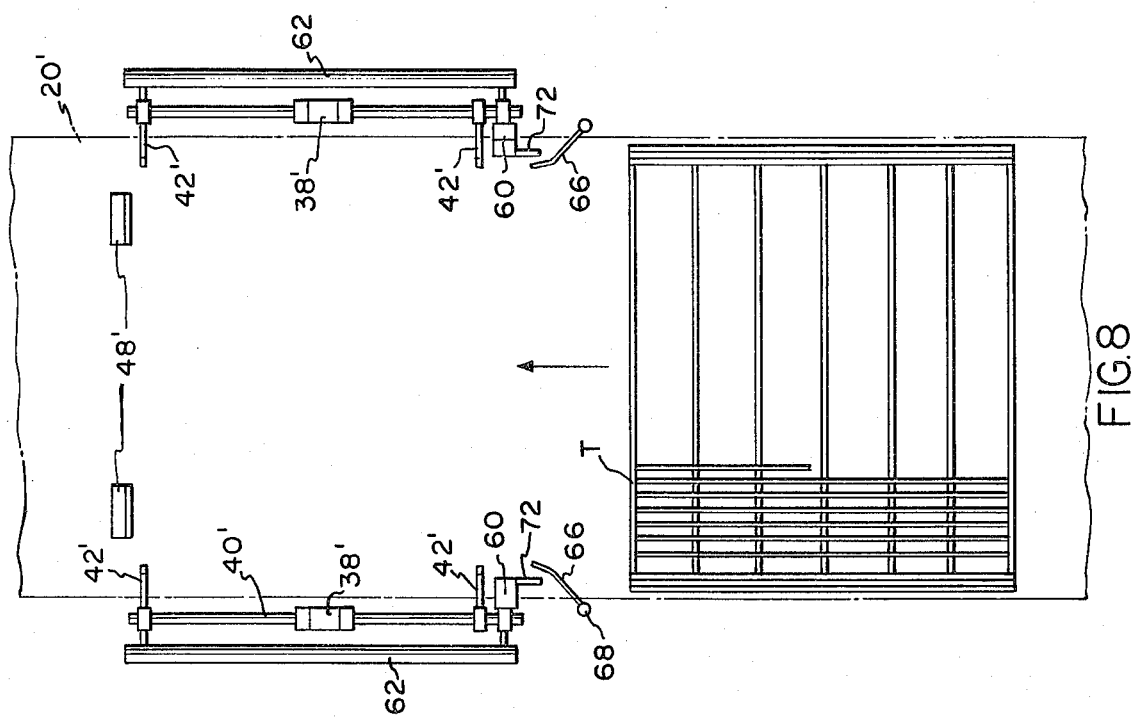
Figure 14:
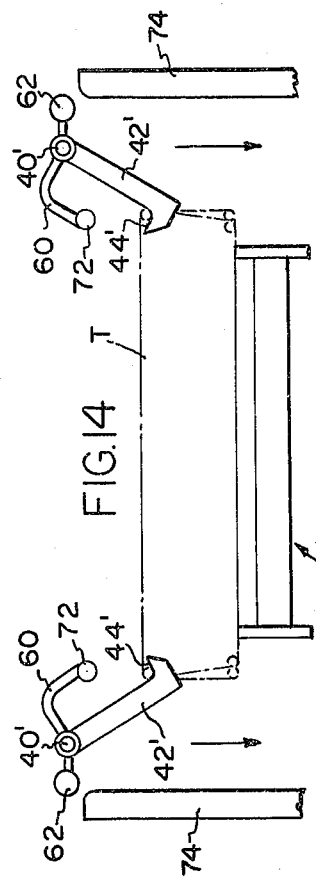
Figure 15:
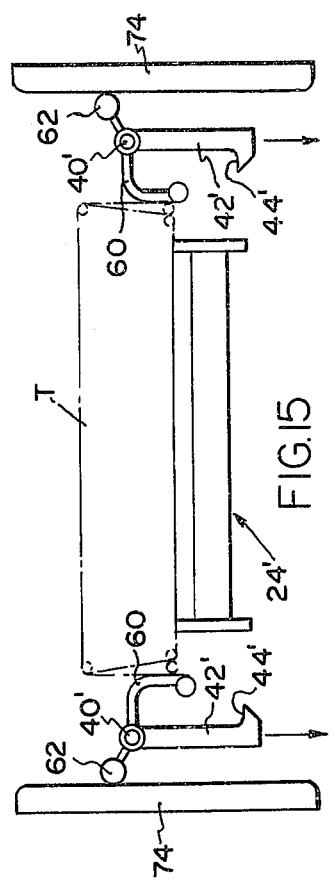
Figure 16:
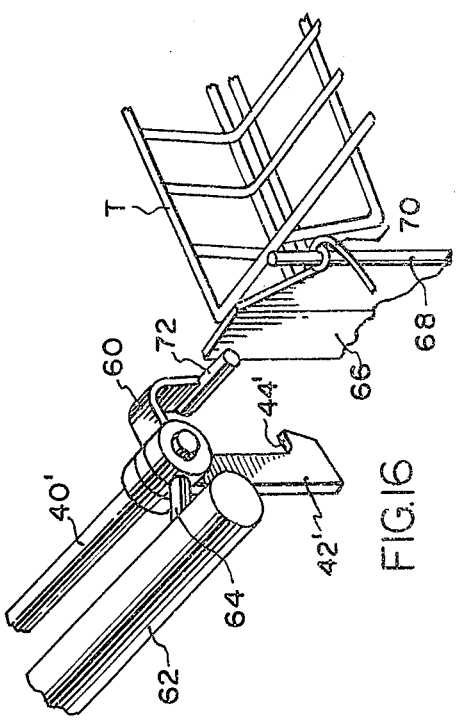
Figure 13:
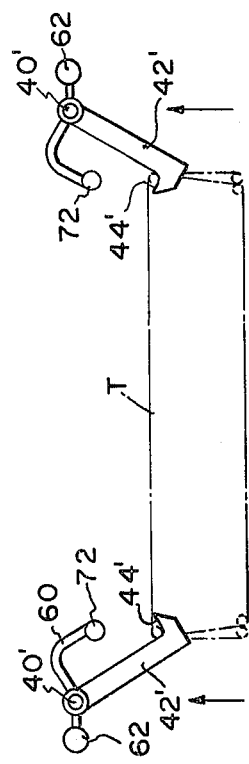
Figure 12:
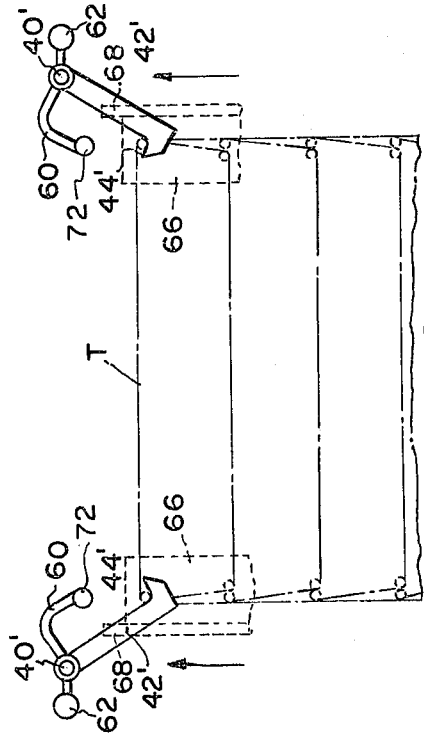

FIGS. 3, 4, 5, 6, and 7 are schematic views showing sequential steps in the operation of the apparatus of FIG. 1;

FIG. 8 is a schematic plan view of an initial step of a modified apparatus employed in an unstacking operation;

FIGS. 9 and 10 are top plan views, similar to FIG. 8, showing successive steps in an unstacking operation;

FIGS. 11, 12, 13, 14 and 15 are schematic end elevational views showing in sequence successive steps in an unstacking operation; and FIG. 16 is a detail perspective view of a portion of the gate mechanism employed in the unstacking operation.

Figure 2:
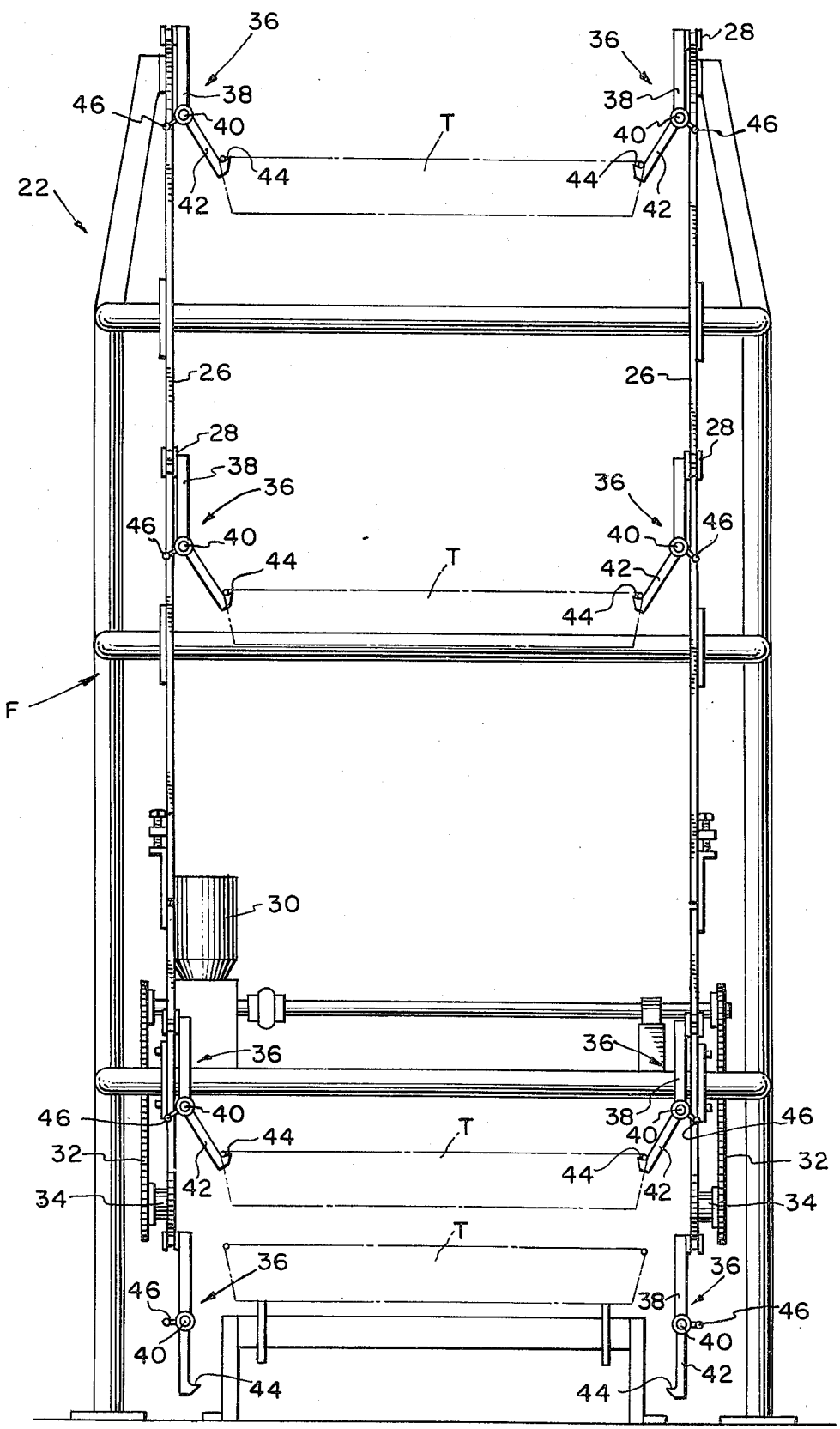
FIG. 2 is an end elevational view of the apparatus of FIG. 1.

Referring first to FIGS. 1 and 2, there is shown in these two figures an embodiment of the invention employed to assemble vertical stacks of trays from a line of trays conveyed on an infeed conveyor designated generally 20. In the particular form of machine shown in FIG. 1, trays T are fed along the upper run of infeed conveyor 20 from left to right as viewed in FIG. 1 into operative relationship with tray handling apparatus of the present invention, designated generally 22, the apparatus 22 removing trays T from infeed conveyor 20 and transferring the trays to a take-away conveyor 24 which is intermittently operated to allow apparatus 22 to assemble a stack of trays (partially shown at the extreme right of FIG. 1). The assembled stack is then conveyed to a location clear of apparatus 22 so that formation of a subsequent stack can be commenced.

Referring now to both of FIGS. 1 and 2, it is seen that apparatus 22 includes a fixed frame designated generally F which supports a pair of generally rectangular track plates 26, plates 26 lying in spaced parallel vertical general planes. The outer edges of track plates 26 constitute runways for a pair of endless chains 28 which are supported upon and trained about the peripheral edges of plates 26 to be guided by the plates in movement around an endless generally rectangular path. The two chains 28 are synchronously driven by a drive means 30 coupled as by chain at sprocket connections 32 to drive sprockets 34 mounted at one corner of each endless chain path. In the stacking arrangement shown in FIGS. 1 and 2, the chains 28 are driven in a clockwise direction as viewed in FIG. 1, moving upwardly along the left-hand vertical run of the chain path and downwardly along the right-hand vertical run of the chain path.

The apparatus as described thus far is equally useful in a stacking or an unstacking operation, for reasons made apparent below, certain modifications of other portions of the apparatus 22 are required to convert the machine from the stacking operation shown in FIGS. 1 and 2 to an unstacking operation.

To perform a stacking operation as shown in FIGS. 1 and 2, apparatus 22 is provided with a series of spaced hook assemblies designated generally 36, the hook assemblies 36 being mounted on the chain 28 in horizontally aligned pairs as best seen in FIG. 2.

Each of hook assemblies 36 includes a bracket 38 pivotally pinned to chain 28 and carrying a horizontally disposed pivot shaft 40 at its lower end. At the outer end of each shaft 40 a pair of hook members 42 are mounted upon the shaft, equidistant from the center line of bracket 38. Hook members 42 are fixedly secured to shaft 40 which in turn is pivotally supported in bracket 38 for movement about a horizontal axis between an inwardly inclined tray engaging position shown by the uppermost three sets of hooks 42 in FIG. 2 and a normal rest or inactive position which is that assumed by the lowermost pair of hooks 42 in FIG. 2.

Each hook includes an elongate shank portion with a tray engaging lip 44 projecting normally from the lower end of the shank portion of the hook. A follower arm 46 mounted on the hub of the hook projects radially from the hook hub and is employed to shift the hook assembly from its inactive or rest position into its tray engaging position as the hook assembly moves upwardly from the horizontal lower run of the chain path toward a tray supported in a ready position upon conveyor 20, the ready position of tray being established by engagement of the tray with a stationary stop 48 adjacent the end of conveyor 20 (FIG. 1).

Referring now particularly to FIGS. 3 through 7, this group of figures shows the sequential steps in the transfer of a tray T from infeed conveyor 20 into a vertical stack supported upon take-away conveyor 24. Referring first to FIG. 3, there is shown in this figure a tray T supported from conveyor 20 in the ready position in which the leading end of the tray T is against stop 48, with the chains 28 (not shown in FIG. 3) carrying a pair of hook members 42 upwardly past the tray. As viewed in FIG. 3, hooks 42 are in their normal rest position in which they are gravitationally maintained and it will be observed that the hooks are moving in a vertical path such that the lip or tray engaging portion of the hook 44 is passing clear of the opposite sides of tray T.

Referring now to FIG. 4, hooks 42 having been elevated somewhat above the position shown in FIG. 3 and at this time the follower arms 45 on the two hooks 42 have moved into engagement with stationary cams 50 mounted upon the machine frame to project into the path of movement of arms 46. As shown in FIG. 4, the engagement between follower arms 46 and stationary cams 50 pivots the hook members 42 inwardly to a position such that the lip portions 44 of hooks 42 are moved into underlying supporting relationship with the upper wire rim of tray T. Thus, the opposite sides of the tray are each engaged at two points by hooks 42 and further elevating movement of hooks 42 from the FIG. 4 position to the FIG. 5 position picks the engaged tray T up from infeed conveyor 20 to elevate the tray along the upwardly moving vertical run of the chain path.

In FIG. 5, hooks 42 have now moved above stationary cams 50, however, the weight of the tray and the inclination of lip 44 gravitationally maintain the hooks in supporting engagement with the tray.

Referring now to FIG. 6, the tray T has passed across the upper horizontal run of the chain path and is descending along the opposite vertical run (right-hand side as viewed in FIG. 1) with the uppermost tray T supported from the hooks 42 having just moved downwardly into engagement with a previously deposited tray T in a stack supported upon take-away conveyor 24. Hooks 42 are shown still engaged with the tray as viewed in FIG. 6, however, it is believed appparent that upon further lowering of the hook assemblies, the hook will be disengaged from beneath the wire rim of the tray T and be free to swing gravitationally back to its normal rest position, shown in FIG. 7, to pass freely downwardly along the opposite sides of the stacked trays. The stack is formed simply by repeatedly conveying trays T from infeed conveyor 20 into position upon the stack until the stack has reached the desired height.

To perform an unstacking operation, a somewhat modified form of hook assembly is employed, the structure of the modified hook assembly being shown in FIGS. 8 through 16. As in the previous case, the hook assembly includes a coupling bracket 38' and pivot shaft 40' as described above. The configuration of the hook, however, is somewhat modified in that in addition to the hook member 42' of a shape similar to that previously described, each hook 42' is provided with an inwardly projecting follower arm 60 and a rearwardly projecting counterweight assembly 62. As best seen in FIG. 16, counterweight 62 consists simply of a rod supported at opposite ends by arms 64 which fixedly couple rod 62 to the hooks 42 at opposite ends of shaft 40. The location of counterweight 62 is such that hooks 42' are gravitationally biased to the inwardly inclined tray engaging position and maintain this position in the absence of some external force.

In the unstacking operation, an intermittently driven infeed conveyor 20' is employed to convey a stack of trays to a ready position established by a suitable stop such as 48' (FIGS. 8, 9, and 10). Before the horizontally moving stack of trays can reach its ready position, it must pass through the path of movement of hooks 42' which, because of the employment of counterweight 62, normally move in their tray engaging position. Thus, the advancing tray stack would encounter interference from the vertically moving hooks 42' unless some means were provided to prevent such interference.

Interference between the horizontally moving stack of trays and the vertically moving hooks 42' is prevented by means of a gate assembly which includes a pair of vertically elongate panels 66 mounted at opposite sides of infeed conveyor 20' for pivotal movement established by vertical pivot shafts 68. The gates are resiliently biased, as by a torsion spring 70 (FIG. 16) into a position such that they project into the path of movement of a stack of trays T along conveyor 20' toward the ready position. Referring briefly to FIG. 16, it will be noted that a horizontally projecting crank 72 is mounted at the distal end of the follower arm 60 to project axially beyond the end of the hook assembly.

Referring now to FIG. 8, there is shown in plan view a stack of trays T approaching the ready position from which they are to be unstacked. In FIG. 8, gates 66 are in what is termed their closed position in which the gates are resiliently biased into the path of trays T.

Referring now to FIG. 9, it is seen that the stack of trays T has advanced toward the ready position from the FIG. 8 position and in so advancing has passed between and pivoted gates 66 outwardly to what will be described as the open position of the gate. When gates 66 are in their open position, the crank arms 72 on hook assemblies moving upwardly in front of the stack are engaged by the outer sides of the gates and pushed outwardly, to thereby pivotally swing hook members 42' to their inactive position clear of the path of movement of the stack of trays T.

In FIG. 10, the stack of trays T have arrived at their ready position in engagement with the fixed stops 48' and the stack of trays has moved beyond gates 66 which are thus released to swing back to their closed position.

Figure 11:
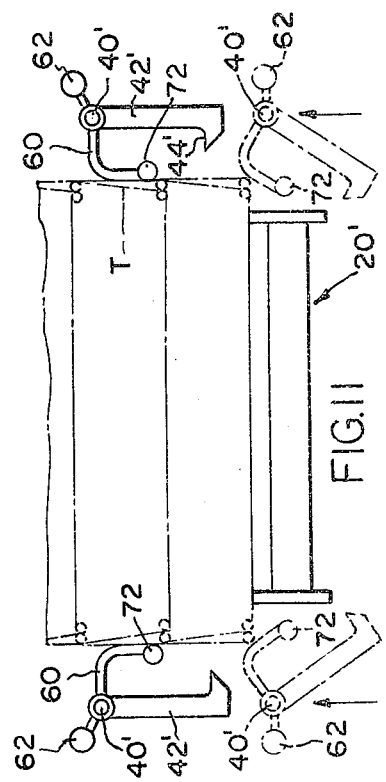

Referring now to FIG. 11, it is seen that with the stack of trays in their rest positions, the projecting follower arms 60 now engage and slide up the sides of the stack of trays to take over from gates 66 and hold the upwardly moving hooks 42' in their inactive position clear of the stack of trays.

Thus, hooks 42' move upwardly along the stack without engaging any of the trays until follower arm 60 passes above the uppermost tray in the stack. As arm 60 moves upwardly beyond the upper edge of the uppermost tray T, counterweight 62 now becomes effective to gravitationally swing hooks 42' into their tray engaging positions and the hooks thus engage the uppermost tray in the stack to lift this tray clear of the stack for conveyance upwardly, thence across the horizontal upper run of the chain path and downwardly along the opposite vertical runs to deposit the removed tray upon a conveyor to be conveyed in line away from the tray receiving station. Because hooks 42' are gravitationally maintained in the tray engaging position by counterweight 62, it is necessary to provide at the tray receiving station a stationary cam, such as 74, to engage counterweight 62 to pivot hooks 42' to their tray release position as the tray is deposited upon the takeaway conveyor 24' (FIGS. 14 and 15).

While exemplary embodiments of the invention have been described in detail, it will be apparent to those skilled in the art that the embodiments described may be modified. Therefore, the foregoing description is to be considered exemplary rather than limiting, and the true scope of the invention is that defined in the following claims.

What is claimed is:

1. In a tray handling apparatus having an infeed conveyor for advancing a stack of trays to a ready position at an unstacking station, a pair of synchronized endless conveyors having parallel first vertical runs extending upwardly on opposite sides of said infeed conveyor at said unstacking station, hook means on said endless conveying means normally biased to a tray engaging position wherein said hook means are operable to support and convey a tray upwardly along said first vertical runs, drive means for synchronously driving said endless conveyors upwardly along said first runs, and first means on said hook means engageable with trays in a stack at said ready position for maintaining said hook means in an inactive position clear of trays in the stack as said hook means move upwardly along said stack until said hook means reaches the uppermost tray in said stack and for then restoring said hook means to said tray engaging positions to operatively engage the uppermost tray in said stack;

the improvement comprising a pair of vertically elongate gates respectively mounted on each side of said infeed conveyor adjacent the inlet to said unstacking station for pivotal movement about respective vertical axes clear of the path of movement of tray stacks on said infeed conveyor, said gates extending upwardly from said infeed conveyor to a height at least equal to the maximum height of a stack of trays to be handled, bias means normally positioning said gates to a closed position wherein said gates project inwardly over said infeed conveyor into the path of movement of tray stacks on said infeed conveyor, said gates being pivotable outwardly to an open position by the passage of a tray stack therebetween and being returned by said bias means to said closed position when said tray stack arrives at said ready position, and second means on said hook means engageable with said gates when said gates are in their open position for locating said hook means in their inactive position to prevent engagement between said hook means and a stack of trays until the trays are located at said ready position.

2. The invention defined in claim 1 wherein said hook means comprises a hook member suspended from said endless conveying means for pivotal movement into and out of said tray engaging position, a counterweight on said hook member gravitationally urging said hook member to said tray engaging position, and said second means comprising a finger coupled to said hook member and slidingly engageable with said gate when said gate is in its open position to pivot said hook member to said inactive position.

3. The invention defined in claim 1 wherein said gate when in said open position is located in the path of movement of said hook member to its tray engaging position.

* * * * *